(12) United States Patent
Tatarczuk et al.

(10) Patent No.: US 9,199,367 B2
(45) Date of Patent: Dec. 1, 2015

(54) GAS BOLT HEATING APPARATUS

(75) Inventors: John Tatarczuk, Prince George (CA);
George Tatarczuk, Prince George (GB)

(73) Assignee: NEWPOL MACHINE WORKS LTD., Prince George (CA)

(*) Notice: Subject to any disclaimer, the term of this patent is extended or adjusted under 35 U.S.C. 154(b) by 479 days.

(21) Appl. No.: 13/282,012

(22) Filed: Oct. 26, 2011

(65) Prior Publication Data

US 2013/0108973 A1    May 2, 2013

(51) Int. Cl.
| | |
|---|---|
| *F23D 14/28* | (2006.01) |
| *B25B 29/02* | (2006.01) |
| *F23D 14/38* | (2006.01) |
| *B23P 19/06* | (2006.01) |

(52) U.S. Cl.
CPC ............... *B25B 29/02* (2013.01); *B23P 19/068* (2013.01); *F23D 14/38* (2013.01)

(58) Field of Classification Search
CPC ................................ B23P 19/068; F23D 14/38
USPC .................. 431/344; 126/401–414; 285/397; 29/525.11; 16/385
See application file for complete search history.

(56) References Cited

U.S. PATENT DOCUMENTS

| | | | |
|---|---|---|---|
| 1,980,156 A | 11/1934 | Emrick | |
| 3,121,908 A * | 2/1964 | Ziegler, Sr. ..................... | 16/385 |
| 3,239,324 A * | 3/1966 | Monks, Jr. ................... | 65/29.21 |
| 3,724,059 A | 4/1973 | Celovsky | |
| 4,991,563 A * | 2/1991 | Ashley ......................... | 126/401 |
| 5,397,876 A | 3/1995 | Shimamoto et al. | |
| 5,399,807 A * | 3/1995 | Yarbrough et al. ........... | 174/653 |
| 5,523,546 A | 6/1996 | Lake | |
| 5,801,358 A | 9/1998 | Yokoyama et al. | |
| 5,938,964 A | 8/1999 | Takita et al. | |
| 6,345,980 B1 * | 2/2002 | Tatarczuk ..................... | 431/344 |
| 2004/0108721 A1 * | 6/2004 | Olson ........................... | 285/357 |
| 2004/0265416 A1 * | 12/2004 | Woods et al. ................. | 425/535 |

FOREIGN PATENT DOCUMENTS

| | | |
|---|---|---|
| CA | 2 305 601 A1 | 10/2001 |
| CA | 2 313 501 A1 | 10/2001 |
| EP | 0 223 713 A1 | 5/1987 |
| EP | 0 928 660 B1 | 7/1999 |
| JP | 54142631 A | 11/1979 |

(Continued)

OTHER PUBLICATIONS

English Translation of the Abstract of JP 2003300121 A.
English Translation of the Abstract of JP 2008101821 A.
English Translation of the Abstract of JP 2000000724 A.
English Translation of the Abstract of JP 61297039 A.
English Translation of the Abstract of JP 60135141 A.
English Translation of the Abstract of JP 54142631 A.
English Translation of the Abstract of JP 11198056 A.

(Continued)

*Primary Examiner* — Kenneth Rinehart
*Assistant Examiner* — Jason Lau
(74) *Attorney, Agent, or Firm* — Cameron IP

(57) ABSTRACT

The present invention relates to a gas bolt heating apparatus for connecting to a heating tube and heating a bolt member. The bolt member has a bore. The heating tube is positionable within the bore. The heating apparatus includes a gas torch having a torch tip through which hot gas passes. The heating apparatus also includes a hollow heater body having a first end and a second end opposite thereof. The body has a central passageway extending from the first end of the body towards its second end. The central passageway is configured to receive the torch tip. The heating tube is connectable to the body. The torch tip is configured to extend into the heating tube for directly heating the heating tube when the heating tube is so connected to the heater body.

11 Claims, 5 Drawing Sheets

(56) References Cited

FOREIGN PATENT DOCUMENTS

| | | | |
|---|---|---|---|
| JP | 60135141 | A | 7/1985 |
| JP | 61297039 | A | 12/1986 |
| JP | 1027824 | A | 1/1989 |
| JP | 7217626 | A | 8/1995 |
| JP | 9216133 | A | 8/1997 |
| JP | 9219286 | A | 8/1997 |
| JP | 11198056 | A | 7/1999 |
| JP | 2000000724 | A | 1/2000 |
| JP | 2003300121 | A | 10/2003 |
| JP | 2008101821 | A | 5/2008 |

OTHER PUBLICATIONS

English Translation of the Abstract of JP 9219286 A.
English Translation of the Abstract of JP 9216133 A.
English Translation of the Abstract of JP 7217626 A.
English Translation of the Abstract of JP 1027824 A.
English Translation of the Abstract of EP 0223 713 A1.
Extended European Search Report, dated Nov. 6, 2013, as issued from the European Patent Office for European Patent Application No. 12772698.2.
English Translation of Japanese Patent Application No. 2003-300121. Publication date of original document: Oct. 21, 2003.

* cited by examiner

GAS BOLT HEATING APPARATUS

FIELD OF THE INVENTION

The present invention relates to a bolt heating apparatus. In particular, the invention relates to a gas bolt heating apparatus for tightening and loosening bolt members.

DESCRIPTION OF THE RELATED ART

It is known per se to provide a gas bolt heating apparatus for heating a bolt member in order to facilitate the loosening or tightening of the bolt member. This is shown, for example, in U.S. Pat. No. 6,345,980 to Tatarczuk ("Patent '980").

The heating apparatus in Patent '980 discloses a heating apparatus having a cylindrical pre-heat chamber within which a gas torch tip extends. The chamber heats up due to hot gas extending from the torch tip and collecting within the chamber. The chamber thus facilitates heating and the passage of heated air towards a tapered mouth and into a heating tube, heating the heating tube thereby. The heating tube is positionable within a hollow stud head and stud for heating these components. The meshed threading of these components so heated longitudinally expands outwards, thereby facilitating the loosening and tightening of the stud head and/or stud.

While this heating apparatus is satisfactory, it may suffer some disadvantages. For example, the exposed pre-heat chamber may become very hot and thus may risk burning the user of the heating apparatus. Also, while cooling conduits may be used to cool the exterior of the chamber, this may act to reduce the efficiency with which the chamber and thus the heating tube are heated. The downwardly convergent air outlet passageways for feeding the flame are disposed within the central passageway through which the torch tip extends. This may limit the volume of air that may pass through the passageway to feed the flame, thus choking out some of the air. This may also inhibit downward movement of hot air into the chamber and heating tube.

BRIEF SUMMARY OF INVENTION

The present invention provides a gas bolt heating apparatus disclosed herein that overcomes the above disadvantages. It is an object of the present invention to provide an improved gas bolt heating apparatus.

There is accordingly provided a gas bolt heating apparatus for connecting to a heating tube and heating a bolt member. The bolt member has a bore. The heating tube is positionable within the bore. The heating apparatus includes a gas torch having a torch tip through which hot gas passes. The heating apparatus also includes a hollow heater body having a first end and a second end opposite thereof. The body has a central passageway extending from the first end of the body towards its second end. The central passageway is configured to receive the torch tip. The heating tube is connectable to the body. The torch tip is configured to extend into the heating tube for directly heating the heating tube when the heating tube is so connected to the heater body.

There is also provided a gas bolt heating apparatus for connecting to a heating tube and heating a bolt member. The bolt member has a bore and the heating tube is positionable within the bore. The heating apparatus includes a gas torch having a torch tip through which hot gas passes. The gas torch emits a flame. The heating apparatus includes a hollow cylindrical housing having a first end, a second end opposite thereof, an interior, and a cylindrical exterior wall extending from the first end to the second end. The housing also has a plurality of circumferentially spaced-apart cooling conduits extending within and along the exterior wall of the housing from adjacent to the first end of the housing towards the second end of the housing. The heating apparatus includes a cylindrical insert disposed within the housing. The insert has a central passageway extending from the first end of the housing towards the second end of the housing. The central passageway is configured to receive the torch tip. The insert has an interior end disposed between the first end and the second end of the housing. The insert has a plurality of circumferentially spaced-apart, downwardly convergent air outlet passageways extending through the interior end of the insert. The downwardly convergent air outlet passageways are configured to direct air passing therethrough towards the torch tip for feeding and directing the flame. The heating apparatus includes a pipe bushing disposed adjacent to the second end of the housing. The pipe bushing threadably connects to the housing. The pipe bushing is also configured to threadably connect to the heating tube. The interior end of the insert is spaced-apart from and adjacent to the pipe bushing. The torch tip extends through the pipe bushing. The torch tip is positioned adjacent to the second end of the housing and is configured to extend into the heating tube for directly heating the heating tube.

There is further provided a gas bolt heating assembly. The assembly includes a plurality of gas bolt heating apparatuses. Each heating apparatus connects to a respective heating tube for heating a respective bolt member having a bore. The heating tubes are positionable within the respective bores. Each of the gas bolt heating apparatus has a gas torch with a torch tip through which hot gas passes. Each of the gas bolt heating apparatus has a hollow heater body. Each of the heater bodies has a first end, a second end opposite thereof, an exterior wall, and a plurality of circumferentially spaced-apart cooling conduits extending within and along its exterior wall. Each of the bodies has a central passageway extending from its first end towards its second end. Each of the central passageways is configured to receive a respective one of the torch tips. The heating tubes are connectable to the bodies. The torch tips are configured to extend into the heating tubes for directly heating the heating tubes. The assembly includes a manifold having a high-pressure housing, a low-pressure housing and a low-pressure regulator. The low-pressure regulator is interposed between and operatively connects together the high-pressure housing and the low-pressure housing. The manifold has a first plurality of conduits in communication with and extending from the high-pressure housing. The first plurality of conduits are configured to supply high-pressure air to the cooling conduits. The manifold also has a second plurality of conduits in communication with and extending from the low-pressure housing. The second plurality of conduits are configured to supply low-pressure air to the respective torch tips of the heating apparatuses.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
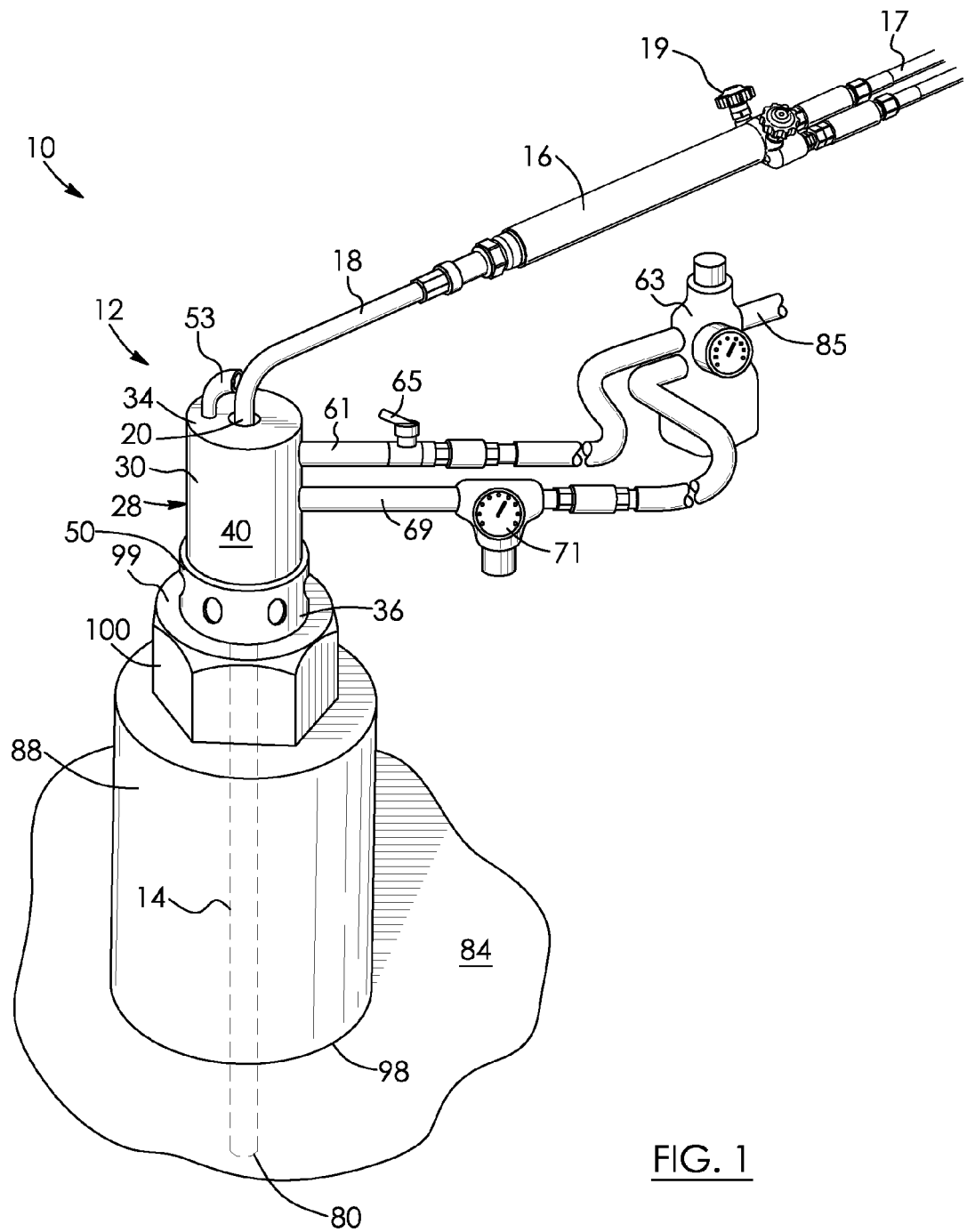
FIG. 1 is a perspective view of a gas bolt heating assembly according to one embodiment, the assembly overlaying and being partially disposed within a hollow stud head and stud that connects two flanges together, only one of which is shown.

Referring to the drawings and first to FIG. 1, there is shown a gas bolt heating assembly 10. The assembly includes a gas bolt heating apparatus 12 and a heating tube 14 for connecting therewith.

Figure 4:
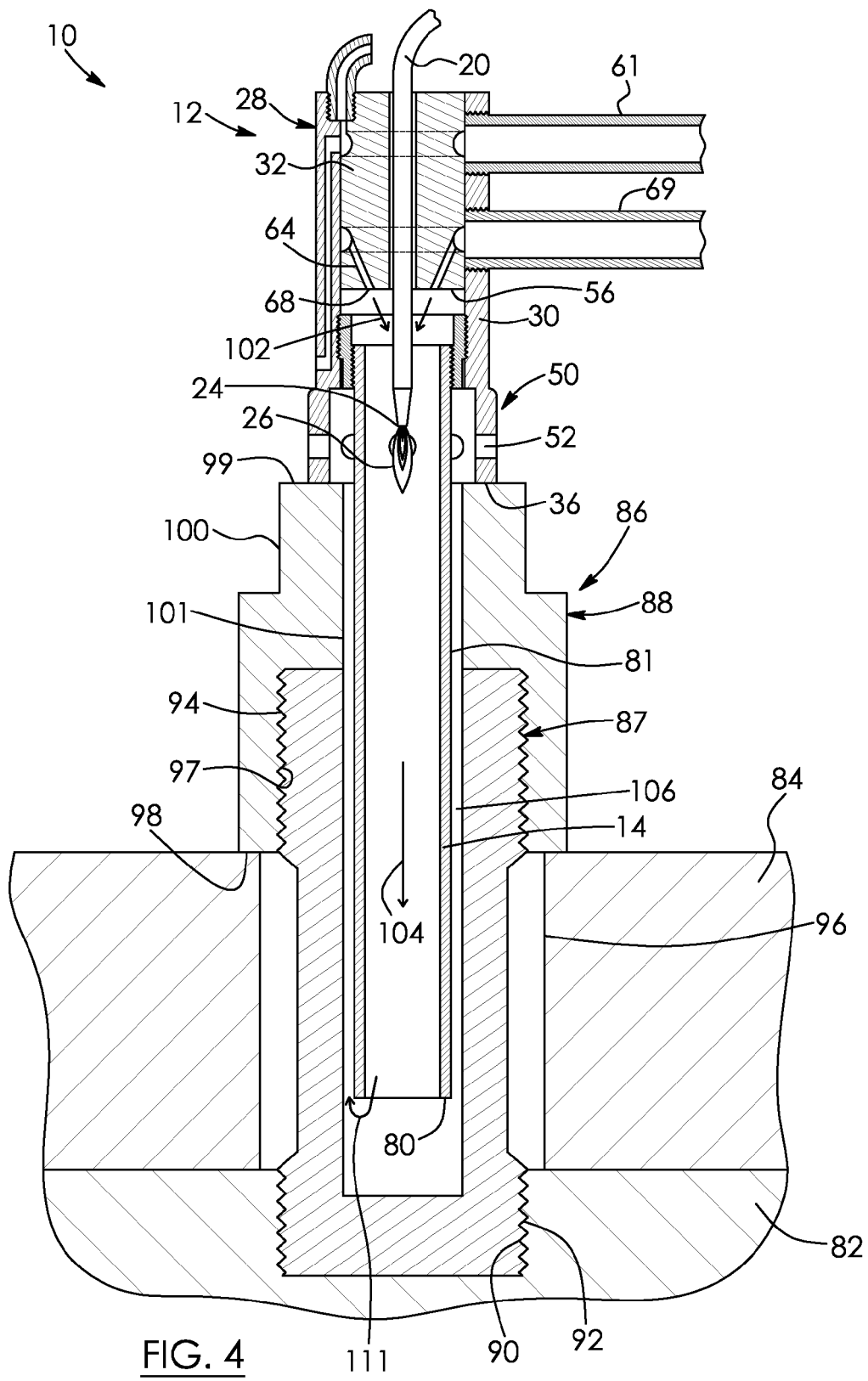
FIG. 4 is a cross-sectional view of the assembly shown in FIG. 1, the hollow stud head and stud, and the pair of flanges connected together.

The gas bolt heating apparatus has a gas torch 16 which is connected to a gas supply 17 for gas to be burned. The gas torch has a torch pipe 18 which is L-shaped, having a torch tip 20, best shown in FIG. 2 and through which hot gas, as indicated by arrow 22, may pass and exit through an open, distal end 24 of the torch tip. The gas torch 16 has a rotatable valve 19 for selectively controlling the amount of gas passing to the torch pipe 18. The gas torch 16 emits a flame 26 when burning, as shown in FIG. 4. Gas torches per se are well known to those skilled in the art, and their parts and function will therefore not be described in detail. These are of brass, in this example, but could be of other metals.

Figure 2:
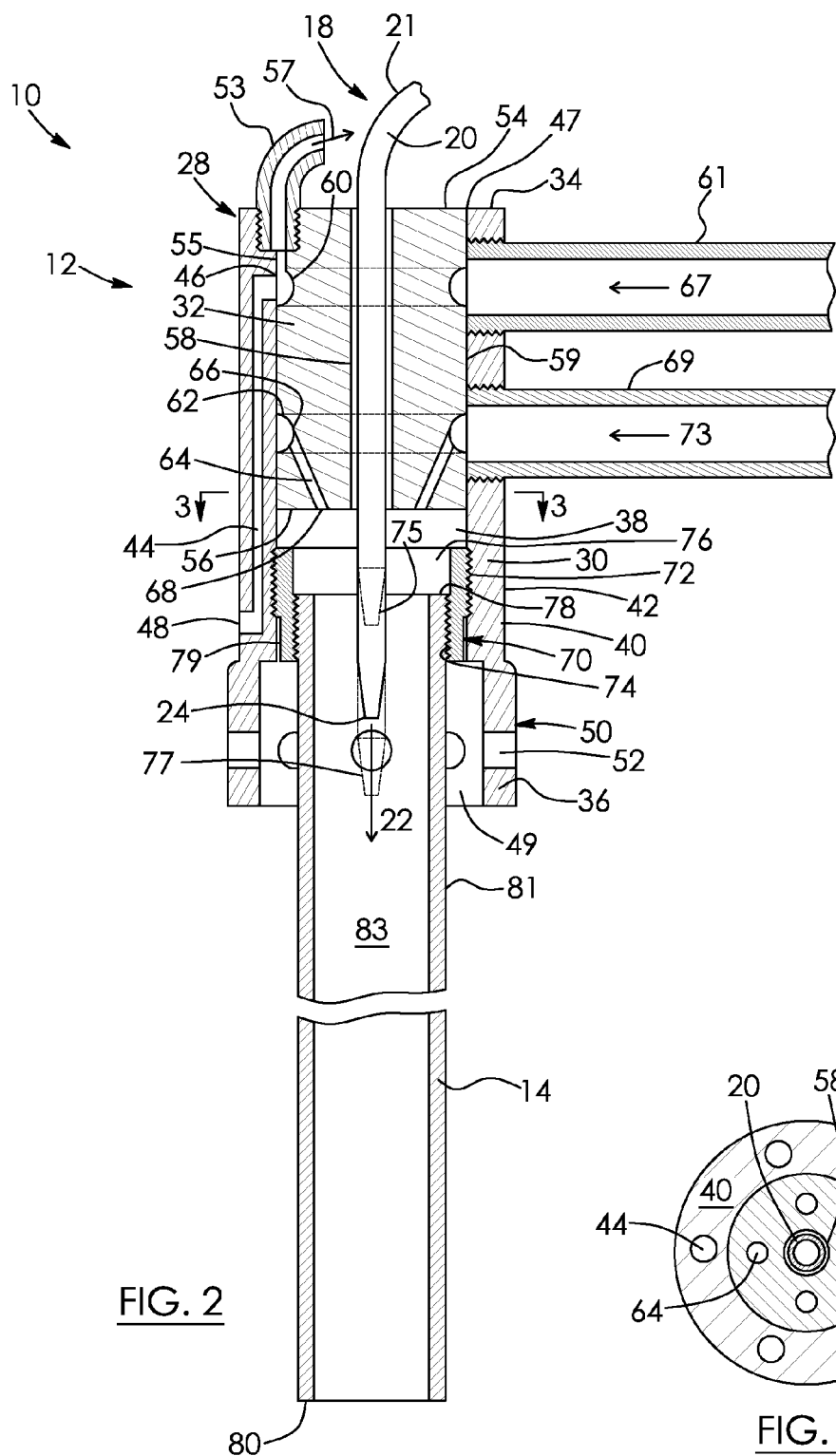
FIG. 2 is a cross-sectional view of part of the assembly shown in FIG. 1, the assembly including a heater body having both a housing and an insert disposed within the housing, and the assembly further including a pipe bushing and a heating tube connected to the housing via the pipe bushing.

Referring back to FIG. 1, the gas bolt heating apparatus 12 includes a hollow heater body 28. As shown in FIG. 2, the heater body comprises a hollow cylindrical housing 30 and an insert 32 disposed within the housing.

The cylindrical housing has a first end 34 and a second end 36 opposite thereof. According to one preferred embodiment, the torch tip 20 is positioned such that the distal end 24 of the torch tip is disposed adjacent to the second end 36 of the housing. The torch tip 20 has an exterior portion 21 that is exterior to the heater body, in this case being spaced-apart from the first end 34 of the housing. The housing 30 has a hollow interior 38 and a cylindrical exterior wall 40 extending from the first end 34 of the housing to the second end 36. The heater body 28 has an exterior 42. The wall 40 is interposed between interior 38 and exterior 42.

Figure 3:
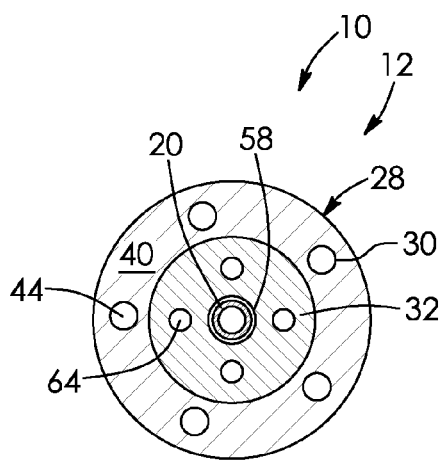
FIG. 3 is a cross-sectional view along the lines 3-3 of FIG. 2, showing cooling conduits extending through the housing of FIG. 2 in more detail and showing passageways extending through the insert of FIG. 2 in more detail.

The housing 30 has a plurality of internal, longitudinally extending, cooling conduits, as shown by conduit 44. The conduits extend through and along exterior wall 40 of the housing 30 to enable cooling of the housing. The cooling conduits are circumferentially spaced-apart. This is best shown in FIG. 3. In this example, five circumferentially spaced-apart conduits are shown, though this number is not strictly required. For example, in other embodiments there may be four to six conduits. Each of the conduits is substantially the same in parts and functions. Referring back to FIG. 2, each conduit, as shown by conduit 44, has an inlet 46 in communication with the interior 38 of the housing 30. The inlets of the conduits are adjacent to the first end 34 of the housing in this example. Each conduit, as shown by conduit 44, has an outlet 48 communicating outwardly through the exterior 42 of the heater body 28. The outlets of the cooling conduits are disposed adjacent to the second end 36 of the housing. The conduits 44 thus extend through the exterior wall 40 from adjacent to the first end 34 of the housing towards the second end 36 of the housing.

The housing 30 has a primary, central bore 47 that extends from end 34 towards end 36 and a secondary, central bore 49 that extends from end 36 towards end 34. Bore 49 is larger in cross-section then bore 47.

The housing 30 has a cylindrical skirt 50 at the second end 36 of the housing. The skirt extends radially outwards relative to the rest of the housing. Bore 49 extends through the skirt. The skirt 50 has a plurality of circumferentially spaced-apart exhaust openings 52 that extend therethrough to enable communication between bore 49 and exterior 42. The distal end 24 of the torch tip 20 is aligned with and adjacent to the exhaust openings as shown in solid lines in FIG. 2.

Insert 32 is disposed within bore 47 of the housing 30. The insert is generally in the shape of a cylinder in this example and has an outer surface 59. The insert 32 has an exterior end 54 aligned with and adjacent to the first end 34 of the housing in this example. The insert extends from its exterior end to an interior end 56 spaced-apart from the exterior end. The interior end of the insert is disposed between the first end 34 of the housing 30 and its second end 36. The insert 32 includes a central passageway 58 extending from end 54 to end 56. The central passageway is configured to receive the torch tip 20. The central passageway 58 is co-axial with both the insert 32 and the housing 30 in this example. The insert 32 has an annular groove 60 that is adjacent to and spaced-apart from exterior end 54. The annular groove extends around the outer surface 59 of the insert, in this example, and is in communication with and links together the inlets of each of the cooling conduits 44.

Referring to FIG. 1, the gas bolt heating apparatus 12 includes an air supply, in this example in the form a conduit 61, to provide air for cooling the housing 30. The gas bolt heating assembly 10 is connected to a high pressure air supply 85 via an adjustable high pressure regulator 63, through which air passes into the conduit 61. The heating apparatus 12 also includes an adjustable valve 65 operatively connected to the conduit and configured for adjusting the quantity of air fed through conduit 61. As shown in FIG. 2, conduit 61 threadably connects to the housing 30 at a location adjacent to and spaced-apart from end 34 of the housing. The conduit 61 is in communication with annular groove 60, which enables air, as indicated by arrow 67, to be selectively fed through the groove and into the cooling conduits 44. The housing is thereby selectively cooled by adjusting valve 65.

The heating apparatus 12 includes a pipe outlet 53 that threadably engages with end 34 of the housing 30 and end 54 of insert 32. The insert has a duct 55 that extends from end 54 to annular groove 60. The pipe outlet 53 is in communication with groove 60 via duct 55. The pipe outlet is shaped to direct cooling air, as indicated by arrow 57, from groove 60 through to the exterior portion 21 of the torch tip 20 to cool the exterior portion of the torch tip. Part of the air passing through conduit 61 is directed to pipe outlet 53 via groove 60 and duct 55. The exterior portion 21 of the torch tip 20 is thus also selectively cooled by adjusting valve 65.

The insert 32 has a further annular groove 62 that is adjacent to and spaced-apart from interior end 56 and which also extends around the outer surface 59 of the insert.

The insert has a plurality of downwardly convergent, circumferentially spaced-apart air outlet passageways, as shown by passageway 64 in FIG. 2. In this example, there are four air outlet passageways, as shown in FIG. 3, though this number of passageways is not strictly required. Each of the air outlet passageways is substantially the same. Referring to FIG. 2, each such passageway, as shown by passageway 64, has an inlet 66 disposed adjacent to the outer surface 59 of the insert. Each of the inlets of the passageways is in communication with annular groove 62. Each of the passageways, as shown by passageway 60, has an outlet 68. Passageway 60 extends radially inwards from inlet 66 to outlet 68. Each of the outlets of the passageways extends through the interior end 56 of the insert. The air outlet passageways 60 are configured to direct air passing therethrough towards the distal end 24 of the torch tip 20 for feeding and directing the flame 26, shown in FIG. 4.

As seen in FIG. 1, the gas bolt heating apparatus 12 has an air supply, in this example shown by conduit 69, for feeding and directing the flame of the gas torch. The gas bolt heating apparatus has an adjustable low pressure regulator 71 interposed between and operatively connected to the high-pressure regulator 63 and conduit 69. The regulator 71 is configured to adjust the quantity of air passing through conduit 69 and into the heater body 28. As shown in FIG. 2, conduit 69 is threadably connected to the housing 30 and is in communication with annular groove 62. Thus, air, as indicated by arrow 73, passing through conduit 69, is fed via groove 62 to each of the passageways 64. The passageways direct the air in a downwardly convergent manner towards the distal end 24 of the torch tip for facilitating burning of the hot gas, and feeding and directing the flame 26 shown in FIG. 4.

As seen in FIG. 2, the gas bolt heating apparatus 12 includes a pipe bushing 70 disposed within the interior 38, and in particular bore 47, of the housing 30. The pipe bushing is an off-the-shelf item in this example, and is spaced-apart from and adjacent to the second end 36 of the housing. The pipe bushing 70 is also positioned so as to be spaced-apart from and adjacent to the interior end 56 of the insert 32. The pipe bushing is generally cylindrical in shape and has upper exterior threads 72 for threadably connecting to the housing 30 at a location spaced-apart from and adjacent to the second end 36 of the housing. The pipe bushing 70 has a cylindrical exterior surface 79 adjacent to the threads 72. The pipe bushing has an interior bore 76 and lower interior threads 74 that extends halfway along the interior bore 76, in this example.

The distal end 24 of the torch tip 20 extends completely through the pipe bushing in this example and is positioned between the pipe bushing and the second end 36 of the housing 30. Alternatively, the distal end 24 of the torch tip may also be aligned with and positioned within the pipe bushing 70, as shown by the torch tip in ghost indicated by numeral 75. As a further alternative, the distal end 24 of the torch tip may be aligned with and adjacent to end 36 as shown by the torch tip in ghost indicated by numeral 77.

The heating tube 14 has a proximal, threaded end 78 and a distal end 80 spaced-apart from end 78. The heating tube also has an exterior 81 extending from end 78 to end 80, and an interior 83. The heating tube 14 is connectable adjacent to the second end 36 of the housing 30 and, in particular, via pipe bushing 70. The pipe bushing is configured to threadably connect to the heating tube 14 via its interior threads 74. The distal end 24 of the torch tip is configured to extend into the interior 83 of the heating tube 14 so as to be near end 78 of the tube, for directly heating the heating tube 14.

The gas bolt heating assembly 10 is used to heat bolts, studs and the like, so as to facilitate the loosening and removal thereof. This may be particularly useful where bolts, studs and the like are connected together via interference fits. It may also be particularly useful where the bolts, studs and the like are particularly large.

This is shown by way of example in FIGS. 1 and 4. Referring in particular to FIG. 4, a pair machine flanges 82 and 84 are connected together via a bolt member 86 in this example comprising stud 87 and a stud head 88. Flange 82 has a threaded aperture 90. The stud 87 has a first threaded end 92 and a second threaded end 94 spaced-apart from end 92. End 92 of the stud connects to flange 82 via threaded aperture 90 of the flange. Flange 84 has a bore 96 through which stud 87 passes. Stud head 88 has a threaded bore 97 extending from its lower end 98 and within which the second end 94 of the stud connects. As shown in FIG. 1, the stud head also has a hexagonal gripping portion 100, adjacent its upper end 99, and to which a socket may connect for tightening or loosening the stud head and/or stud. As shown in FIG. 4, both the stud 87 and the stud head 88 are at least partially hollow. The bolt member 86 has an open-ended central bore 101 which extends partially from end 99 of the stud head to near end 92 of the stud 87. Studs, stud heads, flanges and the like, including their parts and functions, are well known in the art and therefore will not be described in further detail.

In operation and referring to FIGS. 1 and 4, end 36 of the housing 30 abuts end 99 of the stud head 88 and heating tube 14 is positioned within bore 101. The insert 32 is configured to position the torch tip 20 such that distal end 24 of the torch tip is positioned within the heating tube. Flame 26 is thus also disposed within the heating tube 14 and therefore directly heats the tube. This heating is facilitated by the tailored, downwardly convergent stream of air, as indicated by arrows 102, exiting from the interior end 56 of the insert 32 via outlets 68 of the downwardly convergent passageways 64. Heated air, as indicated by arrow 104 extends downwards and along the length of the heating tube 14 until it reaches the distal end 80 of the tube. This heated air then passes along a peripheral, annular passageway 106 formed between the exterior 81 of the tube 14 and bore 101 as shown by arrow 111. The heated tube and heated air passing through passageway 106 cause stud head 88 and stud 87 to be heated, expanding their threads, and thus facilitating the tightening and loosening of the stud head and stud for separating or connecting together flanges 82 and 84. The heated air is then exhausted via openings 52 of the skirt 50 of the housing 30.

Referring now to FIG. 2, throughout this operation and as previously mentioned, air as indicated by arrow 67 passes through conduit 61, through groove 60 and into the plurality of circumferentially spaced-apart cooling conduits 44 for cooling the housing 30. The air then exits via the outlets 48 of the conduits.

The heating apparatus 12 as herein described eliminates the use of a pre-heat chamber, which was previously thought to be necessary. The torch tip 20 extends directly within the heating tube 14. This provides the advantage of improving the safety of using the gas bolt heating apparatus, because heat is now applied more directly within the heating tube. Thus, this structure together with the cooling conduits ensures that the housing 30 remains relatively cool and no longer becomes red hot, thereby reducing the likelihood of the user of getting burnt from inadvertently touching the housing.

Also, the heating apparatus as herein described, with the distal end 24 of the torch tip positioned directly within the heating tube, also allows the heating apparatus to force heat lower into the heating tube compared to prior gas bolt heating apparatuses. The downwardly convergent air outlet passageways 64, which extend to the internal end 56 of insert 32 and face the torch tip, enable air 102 shown in FIG. 4, to further direct heat lower into the heating tube. This heating apparatus as herein described is thus particularly suited, for example, for heating longer stud bolts compared to known gas bolt heating apparatuses. The heating apparatus as herein described enables the user to direct and control heat along the entire length of the stud.

The off-the-shelf pipe bushing 70 may be less expensive to manufacture compared to the lower cylindrical insert with the tapered mouth shown in Patent '980.

Figure 5:
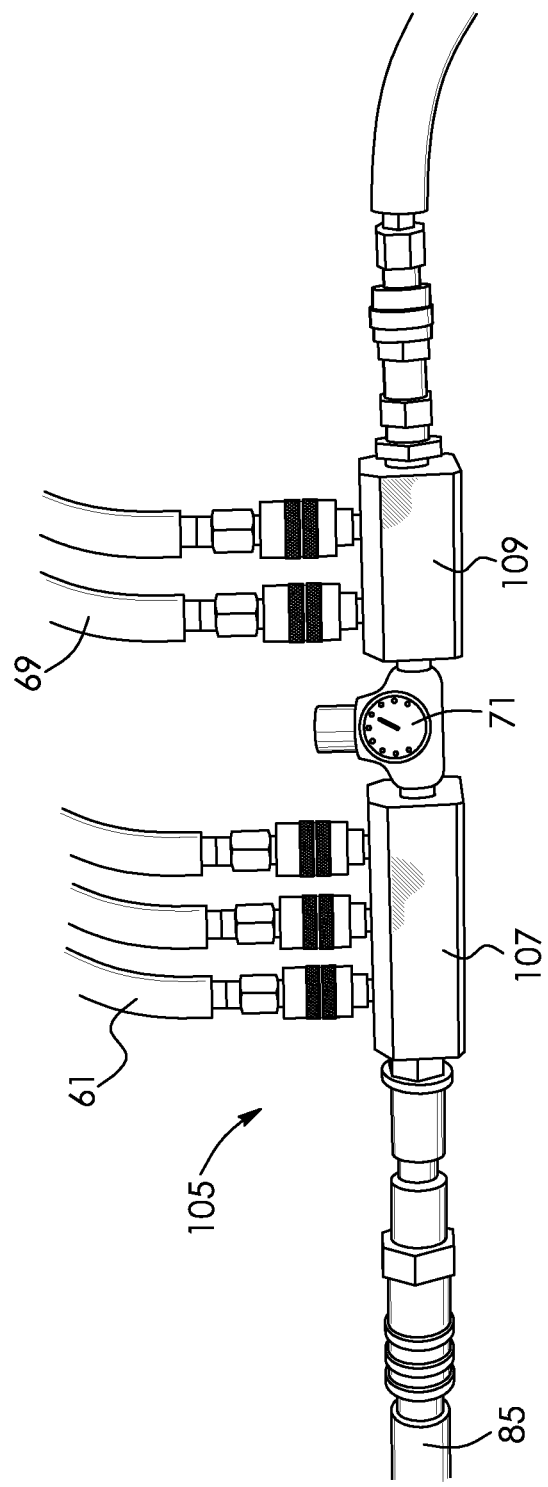
FIG. 5 is a manifold for operating a plurality of gas bolt heating apparatuses such as that shown in FIG. 1.

FIG. 5 shows a manifold 105 that may be used for a plurality of gas bolt heating apparatuses. Like parts have like numbers and function as those shown in FIG. 1. The manifold has a high-pressure housing 107 to which is connected air supply 85, and a first plurality of conduits, as shown by conduit 61, are connected to and in communication with air supply 85 via housing 107. The conduits 61 carry high-pressure air for cooling respective gas bolt heating apparatuses, in this example three different heating apparatuses that may be used all at once. The manifold 105 also has a low-pressure housing 109 and a low-pressure regulator 71. Regulator 71 is interposed between and operatively connected to housings 107 and 109. A second plurality of conduits, as shown by conduit 69, may be connected to and in communication with the housing 109. The conduits 69 carry low-pressure air to respective ones of the three heating apparatuses for finely adjusting the flame of the respective gas bolt heating apparatuses.

Figure 6:
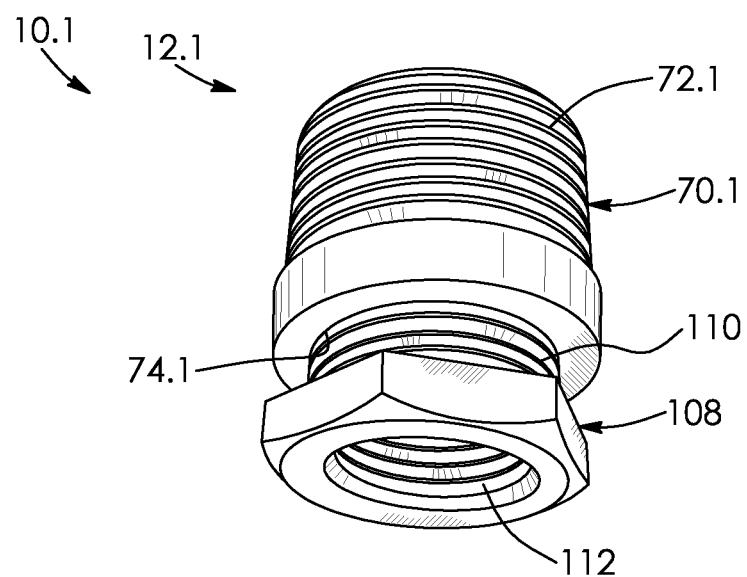
FIG. 6 is a perspective view of a pipe bushing and a bushing reducer for a gas bolt heating assembly according to another embodiment.

FIG. 6 shows a pipe bushing 70.1 together with a bushing reducer 108 disposed therein for a gas bolt heating apparatus according to another embodiment Like parts have like numbers and functions as the embodiment shown in FIGS. 1 to 4 with the addition of ".1". The gas bolt heating apparatus is substantially the same as the gas bolt heating apparatus 12 shown in FIGS. 1 to 4 with the exception that it further includes the bushing reducer 108. Only pipe bushing 70.1 and bushing reducer 108 of the heating apparatus 12.1 are shown in FIG. 6. The bushing reducer has exterior threads 110 for selectively connecting to the interior threads 74.1 of the pipe bushing 70.1. The bushing reducer 108 has a centrally disposed threaded bore 112 configured to receive and connect with a heating tube smaller than that shown in FIGS. 1 to 4. The size of the bushing reducer, including bore 112, may vary. The heating apparatus 12.1 may include a plurality of the bushing reducers for connecting to a plurality of heating tubes of differently-sized exterior diameters. This may further facilitate the speed and ease with which the heating apparatus is used for a job requiring the loosening and/or tightening of a variety of different sized stud heads and studs.

It will be appreciated that yet further variations are possible within the scope of the invention described herein. Also, it will be understood by someone skilled in the art that many of the details provided above are by way of example only and are not intended to limit the scope of the invention which is to be determined with reference to the following claims.

What is claimed is:

1. A gas bolt heating apparatus for connecting to a heating tube and heating a bolt member having a bore, the heating tube being positionable within said bore, and the heating apparatus comprising:

a gas torch emitting a flame and having a torch tip through which hot gas passes, the torch tip having a distal end;

a hollow cylindrical housing having a first end, a second end opposite thereof and a plurality of circumferentially spaced-apart exhaust openings at the second end of the housing, the distal end of the torch tip aligning with and being adjacent to the exhaust openings;

an insert disposed within the housing, the insert having an interior end disposed between the first end and the second end of the housing, a central passageway extending from the first end of the housing to the interior end of the insert, the central passageway being configured to receive said torch tip, and a downwardly convergent air outlet passageway configured to direct air passing therethrough towards said torch tip for feeding and directing the flame, the air outlet passageway extending through said interior end of the insert; and a pipe bushing threadably connected to the housing and being positioned adjacent to the interior end of the insert, the pipe bushing being configured to threadably connect to the heating tube, the torch tip being configured to extend into the heating tube for directly heating the heating tube when the heating tube is so connected to the pipe bushing, the distal end of the torch tip being positioned adjacent to the second end of the housing and being spaced-apart above the bolt member.

2. The apparatus as claimed in claim 1, wherein the housing has an exterior wall and a plurality of cooling conduits extending within and along said exterior wall, the cooling conduits extending from adjacent to the first end of the housing and extending towards the second end of the housing, and wherein the apparatus further includes an air supply for cooling the housing, the air supply for cooling the housing being in communication with said cooling conduits, the air supply providing a flow of air through to the cooling conduits to cool the housing.

3. The apparatus as claimed in claim 1, wherein the housing has an interior, and wherein the apparatus further includes an air supply for feeding and directing the flame of the gas torch, the air supply for feeding and directing the flame being in communication said interior, the air supply for feeding and directing the flame also being in communication with said air outlet passageway and being thus configured to direct air towards the torch tip for facilitating burning of the hot gas.

4. The apparatus as claimed in claim 1, wherein the distal end of the torch tip is aligned with and positioned within the pipe bushing.

5. The apparatus as claimed in claim 1, wherein the distal end of the torch tip is positioned between the pipe bushing and the second end of the housing.

6. The apparatus as claimed in claim 1, wherein the pipe bushing has exterior threads for connecting to the housing and the pipe bushing has interior threads, and wherein the apparatus further includes a plurality of bushing reducers each having exterior threads for selectively connecting to the interior threads of the pipe bushing, each of the bushing reducers having a centrally disposed bore, the bores of the bushing reducers being of different diameters and the bushing reducers thus being configured to connect with a variety of differently-sized heater tubes.

7. The apparatus as claimed in claim 1, wherein the housing has an interior, an exterior, an exterior wall disposed between said interior and said exterior, and a plurality of cooling conduits extending within and along said exterior wall, the cooling conduits being circumferentially spaced-apart, each of the cooling conduits having an inlet in communication with the interior of the housing, the inlets of the cooling conduits being adjacent to the first end of the housing, and each of the cooling conduits having an outlet in communication with the exterior of the housing, the outlets of the cooling conduits being spaced-apart from the first end of the housing.

8. The apparatus as claimed in claim 7 wherein the distal end of the torch tip being positioned between the outlets of the cooling conduits and the second end of the housing.

9. In combination, the apparatus as claimed in claim 1 and a heating tube connected thereto.

10. The combination as claimed in claim 9, wherein the apparatus is configured such that heated air passing through the heating tube communicates with the bore of the bolt member, re-enters the housing and exits via the exhaust openings.

11. The combination as claimed in claim 9, wherein the heating tube has an exterior with a diameter smaller than that of the bore of the bolt member, wherein an annular, peripheral passageway extends between the exterior of the heating tube and the bore, and wherein the exhaust openings are in communication with said peripheral passageway, whereby heated air passing through the heating tube also passes through the peripheral passageway and then outwards to the exhaust openings.

\* \* \* \* \*

UNITED STATES PATENT AND TRADEMARK OFFICE
CERTIFICATE OF CORRECTION

PATENT NO.       : 9,199,367 B2                              Page 1 of 1
APPLICATION NO.  : 13/282012
DATED            : December 1, 2015
INVENTOR(S)      : John Tatarczuk et al.

It is certified that error appears in the above-identified patent and that said Letters Patent is hereby corrected as shown below:

IN THE CLAIMS

Col. 8 Lines 26-33 should read
3. The apparatus as claimed in claim 1, wherein the housing has an interior, and wherein the apparatus further includes an air supply for feeding and directing the flame of the gas torch, the air supply for feeding and directing the flame being in communication with said interior, the air supply for feeding and directing the flame also being in communication with said air outlet passageway and being thus configured to direct air towards the torch tip for facilitating burning of the hot gas.

Col. 8 lines 61-63 should read
8. The apparatus as claimed in claim 7 wherein the distal end of the torch tip is positioned between the outlets of the cooling conduits and the second end of the housing.

Signed and Sealed this
Ninth Day of February, 2016

Michelle K. Lee
*Director of the United States Patent and Trademark Office*